United States Patent
Murakami

(10) Patent No.: US 8,311,700 B2
(45) Date of Patent: Nov. 13, 2012

(54) CONTROL APPARATUS FOR VEHICLE

(75) Inventor: Yoshifumi Murakami, Obu (JP)

(73) Assignee: Denso Corporation, Kariya (JP)

( * ) Notice: Subject to any disclaimer, the term of this patent is extended or adjusted under 35 U.S.C. 154(b) by 559 days.

(21) Appl. No.: 12/535,999

(22) Filed: Aug. 5, 2009

(65) Prior Publication Data

US 2010/0036558 A1 Feb. 11, 2010

(30) Foreign Application Priority Data

Aug. 8, 2008 (JP) ................................. 2008-205953

(51) Int. Cl.
    *G01M 17/00* (2006.01)

(52) U.S. Cl. ..................... 701/33.7; 701/29.1; 701/29.2; 701/29.7; 701/30.7; 701/31.7; 123/350

(58) Field of Classification Search ........................ None
    See application file for complete search history.

(56) References Cited

U.S. PATENT DOCUMENTS

| | | | | |
|---|---|---|---|---|
| 4,940,030 A * | 7/1990 | Morikawa | ................. | 123/198 D |
| 5,601,063 A * | 2/1997 | Ohashi et al. | ................. | 123/396 |
| 5,673,668 A * | 10/1997 | Pallett et al. | ................. | 123/436 |
| 6,009,360 A * | 12/1999 | Knapp | ......................... | 701/29.4 |
| 6,178,947 B1 * | 1/2001 | Machida et al. | ............. | 123/396 |
| 6,667,622 B1 * | 12/2003 | Lenehan | ....................... | 324/384 |
| 6,805,094 B2 * | 10/2004 | Hashimoto et al. | ........... | 123/396 |
| 7,463,951 B2 * | 12/2008 | Ampunan et al. | ................ | 701/1 |
| 2003/0183194 A1 * | 10/2003 | Noguchi | ....................... | 123/396 |
| 2006/0287783 A1 * | 12/2006 | Walker | ............................ | 701/29 |
| 2007/0244611 A1 * | 10/2007 | Brozovich | ...................... | 701/29 |
| 2008/0011270 A1 * | 1/2008 | Yamane et al. | ............... | 123/350 |
| 2010/0036558 A1 * | 2/2010 | Murakami | ...................... | 701/33 |

FOREIGN PATENT DOCUMENTS

JP          06-149348          5/1994

* cited by examiner

*Primary Examiner* — Dalena Tran
*Assistant Examiner* — Jonathan L Sample
(74) *Attorney, Agent, or Firm* — Nixon & Vanderhye, P.C.

(57) ABSTRACT

In a microcomputer, a signal processing device computes a control signal, such as an accelerator position, a throttle position, based on a sensor output signal, such as an output signal of an accelerator position sensor, an output signal of a throttle position sensor. A torque control device executes a torque control operation to coincide an actual torque with a requested torque based on the control signal. Furthermore, a torque monitor device determines whether a torque increase abnormality exists based on the control signal. A signal abnormality diagnosis device determines whether an operational abnormality of the signal processing device exists based on a relationship between the sensor output signal and the control signal. A monitor IC monitors operational states of the torque monitor device and of the signal abnormality diagnosis device and determines whether an operational abnormality of the torque monitor device or of the signal abnormality diagnosis device exists.

7 Claims, 6 Drawing Sheets

FIG. 2A

| SENSED ACCELERATOR POSITION VALUE APS (%) | | OUTPUT SIGNAL OF ACCELERATOR POSITION SENSOR APS_AD (V) | |
|---|---|---|---|
| | | HIGH | LOW |
| | HIGH | OK (NORMAL) | NG (ABNORMAL) |
| | LOW | OK (NORMAL) | OK (NORMAL) |

FIG. 2B

| ESTIMATED ACTUAL TORQUE VALUE Trq (Nm) | | OUTPUT SIGNAL OF THROTTLE POSITION SENSOR Thr_AD (V) | |
|---|---|---|---|
| | | HIGH | LOW |
| | HIGH | OK (NORMAL) | OK (NORMAL) |
| | LOW | NG (ABNORMAL) | OK (NORMAL) |

CONTROL APPARATUS FOR VEHICLE

CROSS REFERENCE TO RELATED APPLICATION

This application is based on and incorporates herein by reference Japanese Patent Application No. 2008-205953 filed on Aug. 8, 2008.

BACKGROUND OF THE INVENTION

1. Field of the Invention

The present invention relates to a control apparatus for a vehicle.

2. Description of Related Art

Nowadays, vehicles are equipped with various electronically controlled systems. For instance, in such a vehicle, as recited in Japanese Unexamined Patent Publication No. H06-149348A, in order to guarantee an operational reliability of the control system, an output signal of a sensor is inputted to two microcomputers, and these two computers execute an identical computation based on the common output signal of the sensor. Then, the computed results of these computers are compared with each other to determine whether an abnormality exists in the control system.

However, according to the technique of Japanese Unexamined Patent Publication No. H06-149348A, the two microcomputers, which execute the identical computation, need to be provided in the one control system. Therefore, it cannot meet the low cost demand, which is considered as the important technical goal in these days.

The inventor of the present invention has been working on a system which can guarantee an operational reliability of the control system through use of one microcomputer and one monitor integrated circuit (IC). Specifically, with reference to FIG. 5, in the microcomputer 13, a signal processing device 16 computes control signals (e.g., a signal indicating a sensed accelerator position value, a signal indicating a sensed throttle position value) based on output signals of sensors (e.g., an accelerator position sensor 11, a throttle position sensor 12) after the output signals of the sensors are processed through an analogue-to-digital (A/D) converter 15. Then, a torque control device 17 executes a control operation of actuators 14 (e.g., a throttle valve, a fuel injection valve, a spark plug) in such a manner that an actual torque of an internal combustion engine coincides with a requested torque based on the computed control signals. In such a control system, a torque monitor device 19 of the microcomputer 13 compares the actual torque and the requested torque based on the control signals and determines whether a torque increase abnormality (an abnormality, in which the actual torque becomes excessively large relative to the requested torque) exists. Furthermore, the monitor IC 21, which is provided separately from the microcomputer 13, monitors the operational state of the torque monitor device 19 and determines whether an operational abnormality of the torque monitor device 19 exists. In the experimental study of the above system, the following disadvantages have been identified.

In the torque control system of FIG. 5, although it is possible to guarantee the proper operation of the torque monitor device 19 with use of the monitor IC 21, there is no function, which guarantees the proper operation of the signal processing device 16. Therefore, in a case where the torque monitor device 19 functions property, when the abnormal value of the control signal (e.g., the sensed accelerator position value) is generated due to the operational abnormality of the signal processing device 16, the torque monitor device 19 determines whether the torque increase abnormality exists based on the abnormal control signal. Therefore, in a case where the torque increase abnormality actually exists, there is a high possibility of that such a torque increase abnormality cannot be sensed, and thereby the operational reliability of the control system cannot be sufficiently ensured.

In order to address the above disadvantage, as shown in FIG. 6, the monitor IC 21 may monitor the operational state of the signal processing device 16 and the operational state of the torque monitor device 19 and may determine whether the operational abnormality of the signal processing device 16 or of the torque monitor device 19 exists. In this way, the proper operation of the signal processing device 16 and the proper operation of the torque monitor device 19 can be guaranteed with the monitor IC 21.

However, in the torque control system shown in FIG. 6, the monitor IC 21 monitors the operational state of the signal processing device 16. Therefore, the signal processing device 16 needs to have an additional function of executing computation based on test data, which is used to test the operation of the signal processing device 16, and the monitor IC 21 needs to have an additional function of checking the computed result of the signal processing device 16, which is computed based on the test data. Therefore, the computational load is increased on the microcomputer 13 and the monitor IC 21. As a result, it is necessary to increase the computational performance of the microcomputer 13 and the computational performance of the monitor IC 21. Thus, in such a case, it is not possible to satisfy the low cost demand.

SUMMARY OF THE INVENTION

The present invention addresses the above disadvantages. Thus, it is an objective of the present invention to provide a control apparatus for a vehicle capable of ensuring an operational reliability of a system of the vehicle while satisfying a low cost demand.

To achieve the objective of the present invention, there is provided a control apparatus for a vehicle, including a microcomputer and a monitoring means. The microcomputer includes a signal processing means, a control abnormality diagnosing means and a signal abnormality diagnosing means. The signal processing means is for computing a control signal, which is used in a control operation of the vehicle, based on an output signal of at least one sensor installed in the vehicle. The control abnormality diagnosing means is for determining whether a control abnormality of the microcomputer exists based on the control signal. The signal abnormality diagnosing means is for determining whether an operational abnormality of the signal processing means exists based on a relationship between the output signal of the at least one sensor and the control signal. The monitoring means is for determining whether at least one of an operational abnormality of the control abnormality diagnosing means and an operational abnormality of the signal abnormality diagnosing means exists by monitoring an operational state of the control abnormality diagnosing means and an operational state of the signal abnormality diagnosing means. The monitoring means is provided separately from the microcomputer.

BRIEF DESCRIPTION OF THE DRAWINGS

The invention, together with additional objectives, features and advantages thereof, will be best understood from the following description, the appended claims and the accompanying drawings in which:

FIG. 2A is a diagram showing a way of performing an abnormal diagnosis of a signal processing device based on an output signal APS_AD of an accelerator position sensor and a sensed accelerator position value APS in the torque control system shown in FIG. 1;

FIG. 2B is a diagram showing a way of performing an abnormality diagnosis of the signal processing device based on a relationship between an output signal Thr_AD of a throttle position sensor and an estimated actual torque value Trq in the torque control system;

DETAILED DESCRIPTION OF THE INVENTION

Figure 1:
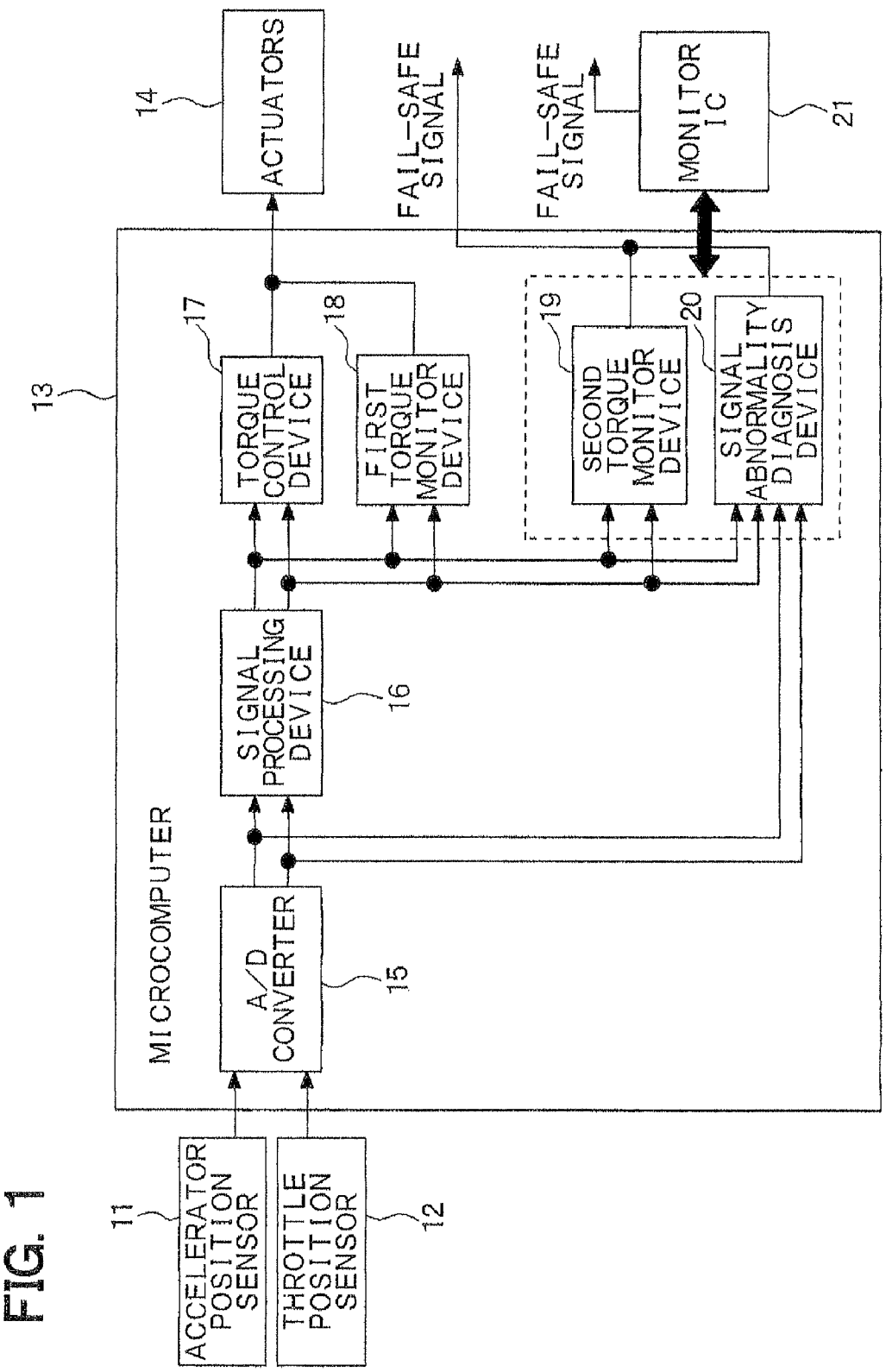
FIG. 1 is a block diagram indicating a structure of a torque control system according to an embodiment of the present invention.

An embodiment of the present invention will be described with reference to the accompanying drawings.

An entire structure of a torque control system of an internal combustion engine (hereinafter, simple referred to as an engine) will be described with reference to FIG. 1.

Output signals of sensors, such as an accelerator position sensor 11 and a throttle position sensor 12, are supplied to a microcomputer 13 (more specifically, a CPU of the microcomputer 13). The accelerator position sensor 11 senses an accelerator position (e.g., a position of an accelerator pedal in an automobile, a position of an accelerator grip in a motorcycle or the like), and the throttle position sensor 12 senses a throttle position (a position of a throttle valve, i.e., an opening degree of the throttle valve). The microcomputer 13 executes various engine control programs stored in a ROM (not shown) to control corresponding actuators 14 (e.g., the throttle valve, a fuel injection valve, a spark plug) according to an engine operational state.

In the microcomputer 13, an analogue-to-digital (A/D) converter 15 executes analogue-to-digital (A/D) conversion of the output signals (output voltages) of the sensors (e.g., the accelerator position sensor 11, the throttle position sensor 12). Then, a signal processing device 16 (a signal processing means) computes corresponding control signals (a signal indicating a sensed accelerator position value, a signal indicating a sensed throttle position value or the like), which are used in the torque control system, based on the sensor output signals, which have been previously A/D converted.

Thereafter, a torque control device 17 (a torque control means) executes a torque control operation to control each corresponding actuator 14 (e.g., the throttle valve, the fuel injection valve, the spark plug). Specifically, the torque control device 17 computes an actual torque based on the sensed throttle position value. The torque control device 17 also computes a requested torque based on the sensed accelerator position value. Then, the torque control device 17 computes a target throttle position, a fuel injection quantity and ignition timing in such a manner that the actual torque coincides with the requested torque. Thereafter, the torque control device 17 controls each corresponding actuator 14 (e.g., the throttle valve, the fuel injection valve, the spark plug) to implement, for example, the computed target throttle position, the computed fuel injection quantity and the computed ignition timing. Furthermore, in the microcomputer 13, a first torque monitor device 18 determines whether an abnormality exists in the torque control operation caused by a factor, which is other than an abnormality in the microcomputer 13, based on the control signal, which is computed at the signal processing device 16.

Furthermore, in the microcomputer 13, a second torque monitor device 19 (a control abnormality diagnosing means) determines whether an abnormality, which is caused by an abnormality in the microcomputer 13, exists in the torque control operation based on the control signal computed at the signal processing device 16. Specifically, the second torque monitor device 19 computes the actual torque based on the sensed throttle position value. Also, the second torque monitor device 19 computes the requested torque based on the sensed accelerator position value. Then, the second torque monitor device 19 compares the actual torque and the requested torque to determine whether a torque increase abnormality exists. The torque increase abnormality is defined as an abnormality, in which the actual torque becomes excessively large relative to the requested torque (i.e., the actual torque being larger than the requested torque by more than a preset value).

Furthermore, in the microcomputer 13, a signal abnormality diagnosis device 20 (a signal abnormality diagnosing means) determines whether an operational abnormality exists in the signal processing device 16 based on a relationship between the sensor output signal, which is inputted to the signal processing device 16, and the computed control signal, which is computed in the signal processing device 16 (e.g., a relationship between the output signal of the accelerator position sensor lit which has been previously A/D converted at the A/D converter 15, and the sensed accelerator position value computed at the signal processing device 16).

Specifically, as shown in FIG. 2A, the signal abnormality diagnosis device 20 determines whether the output signal APS_AD of the accelerator position sensor 11, which has been previously A/D converted at the A/D converter 15, is smaller than a predetermined value A1 (e.g., a sensor output, which is slightly larger than that of an accelerator off time, which is the time when the operator of the vehicle turns off, i.e., releases the accelerator pedal or accelerator grip) to determine whether the output signal APS_AD of the accelerator position sensor 11 is a low level or a high level. Also, the signal abnormality diagnosis device 20 determines whether the sensed accelerator position value APS computed at the signal processing device 16 is smaller than a predetermined value A2 (e.g., an accelerator position, which is slightly larger than that of the accelerator off time) to determine whether the sensed accelerator position value APS is a low level or a high level.

When it is determined that the output signal APS_AD of the accelerator position sensor 11 and the sensed accelerator position value APS are both in the low level or both in the high level, the relationship between the output signal APS_AD of the accelerator position sensor 11 and the sensed accelerator position value APS is correct. Therefore, the signal abnormality diagnosis device 20 determines that the operational abnormality of the signal processing device 16 does not exist, i.e., the operation of the signal processing device 16 is normal.

In a case where the output signal APS_AD of the accelerator position sensor 11 is in the high level while the sensed accelerator position value APS is in the low level, the relationship between the output signal APS_AD of the accelerator position sensor 11 and the sensed accelerator position value APS is not correct. However, in such a case, the requested torque, which is computed based on the sensed accelerator position value APS, becomes abnormally small, so that the second torque monitor device 19 determines that the torque increase abnormality (the abnormality, in which the actual torque becomes excessively large relative to the requested torque) exists. Therefore, it is determined that the relationship between the output signal APS_AD of the accelerator position sensor 11 and the sensed accelerator position value APS is the relationship, which can be sensed as the torque increase abnormality by the second torque monitor device 19. Thereby, the signal abnormality diagnosis device 20 determines that the operational abnormality of the signal processing device 16 does not exist.

In contrast, in a case where the output signal APS_AD of the accelerator position sensor 11 is in the low level (the output signal APS_AD of the accelerator position sensor 11 being smaller than the predetermined value A1, i.e., being on the valve closing side of the predetermined value A1) while the sensed accelerator position value APS is in the high level (the sensed accelerator position value APS being larger than the predetermined value A2), the relationship between the output signal APS_AD of the accelerator position sensor 11 and the sensed accelerator position value APS is not correct. In this case, the requested torque, which is computed based on the sensed accelerator position value APS, becomes abnormally large. Therefore, it is difficult to sense the torque increase abnormality (the abnormality, in which the actual torque becomes excessively large relative to the requested torque) at the second torque monitor device 19. Therefore, it is determined that the relationship between the output signal APS_AD of the accelerator position sensor 11 and the sensed accelerator position value APS is the relationship, which interferes with the sensing of the torque increase abnormality by the second torque monitor device 19. Thereby, the signal abnormality diagnosis device 20 determines that the operational abnormality of the signal processing device 16 exists.

Furthermore, as shown in FIG. 1, a monitor integrated circuit (IC) 21, which serves as a monitoring means, is provided separately from the microcomputer 13. The monitor IC 21 monitors the operational state of the second torque monitor device 19 and determines whether an operational abnormality of the second torque monitor device 19 exists. Also, the monitor IC 21 monitors the operational state of the signal abnormality diagnosis device 20 and determines whether an operational abnormality of the signal abnormality diagnosis device 20 exists.

Figure 3:
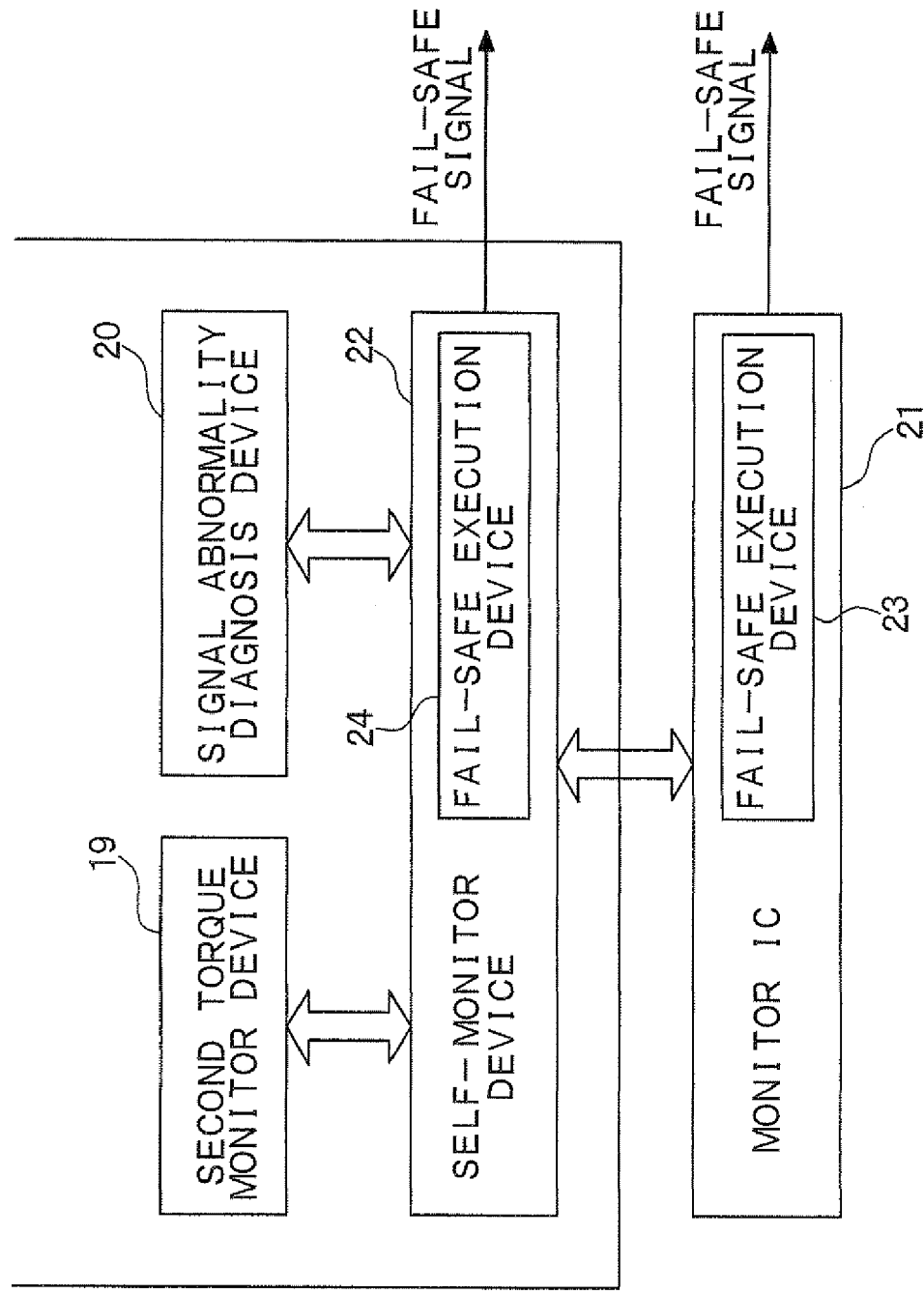
FIG. 3 is a block diagram showing a monitor function of a monitor IC according to the embodiment.

Specifically, as shown in FIG. 3, a self-monitor device 22 of the microcomputer 13, which is not illustrated in FIG. 1 for the sake of simplicity, outputs test data to the second torque monitor device 19, and a computed result of the second torque monitor device 19, which is computed based on the test data, is outputted to the monitor IC 21 and the self-monitor device 22. Each of the monitor IC 21 and the self-monitor device 22 checks the computed result of the second torque monitor device 10, which is computed based on the test data, and determines whether the operational abnormality exists in the second torque monitor device 19.

Furthermore, the self-monitor device 22 outputs test data to the signal abnormality diagnosis device 20. Then, the computed result of the signal abnormality diagnosis device 20, which is computed based on the test data, is outputted to the monitor IC 21 and the self-monitor device 22. Each of the monitor IC 21 and the self-monitor device 22 checks the computed result of the signal abnormality diagnosis device 20, which is computed based on the test data, and determines whether the operational abnormality exists in the signal abnormality diagnosis device 20.

Furthermore, each of the monitor IC 21 and the self-monitor device 22 has a corresponding fail-safe execution device (executing means) 23, 24. When at least one of the second torque monitor device 19, the signal abnormality diagnosis device 20, the monitor IC 21 and the self-monitor device 22 is determined to have the abnormality, i.e., when at least one of the torque increase abnormality, the operational abnormality of the signal processing device 16, the operational abnormality of the second torque monitor device 19 and the operational abnormality of the signal abnormality diagnosis device 20 is sensed, a fail-safe signal is outputted from the fail-safe execution device 23, 24 to immediately execute a fail-safe control operation. In the fail-safe control operation, for example, the throttle position may be forcefully maintained at a predetermined position (known as an opener position) to limit the intake air quantity of the engine and thereby to limit an output torque of the engine.

Figure 4:
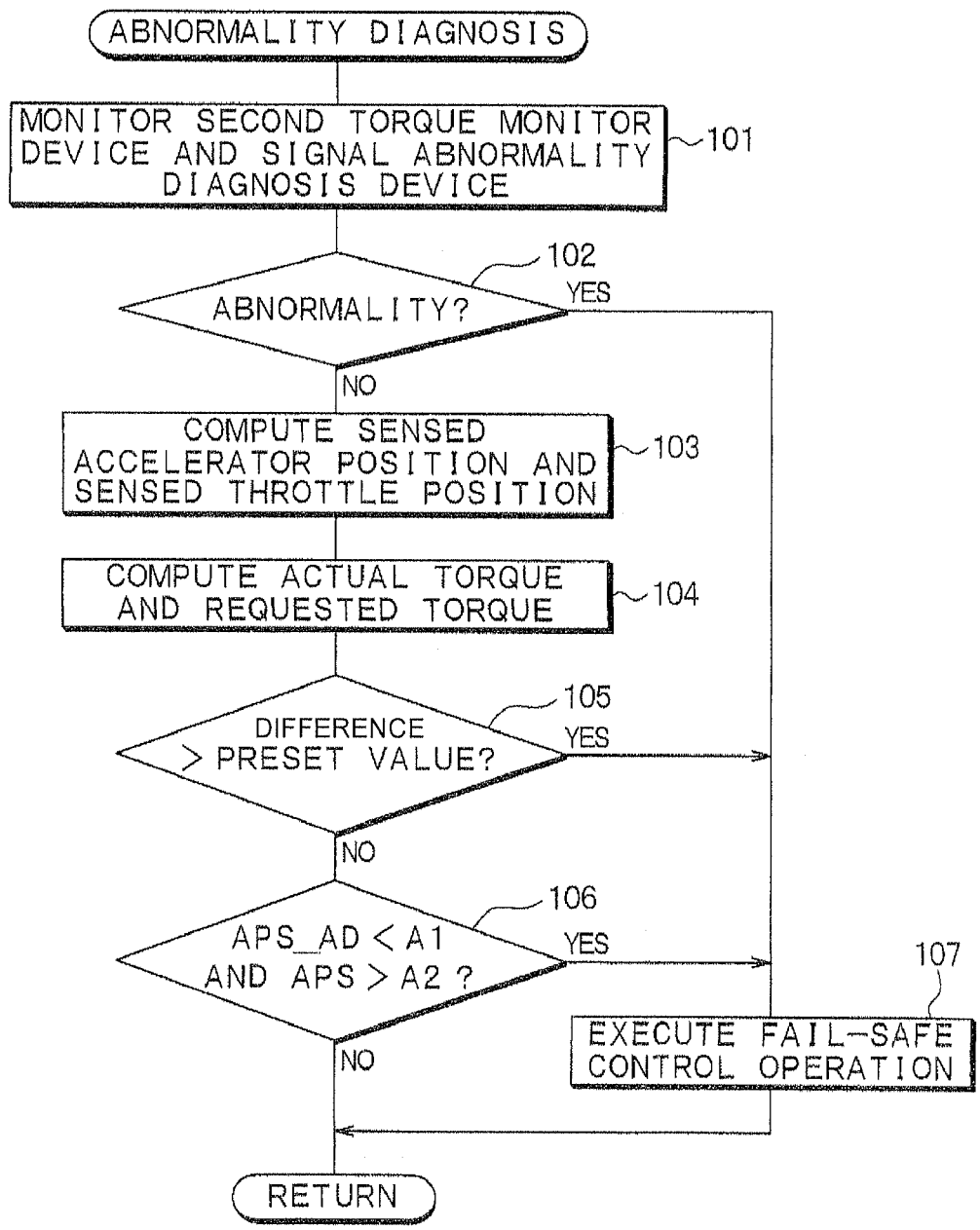
FIG. 4 is a flowchart showing an abnormality diagnosis routine according to the embodiment.

In the abnormality diagnosis operation of the torque control system, an abnormality diagnosis routine shown in FIG. 4 is executed by the microcomputer 13 and the monitor IC 21. Hereinafter, the abnormality diagnosis routine will be described in detail.

The abnormality diagnosis routine shown in FIG. 4 is executed at predetermined intervals. When this routine starts, at step 101, the monitor IC 21 monitors the operational state of the second torque monitor device 19 and determines whether an operational abnormality of the second torque monitor device 19 exists. Also, the monitor IC 21 monitors the operational state of the signal abnormality diagnosis device 20 and determines whether an operational abnormality of the signal abnormality diagnosis device 20 exists.

Thereafter, the operation proceeds to step 102 where it is determined whether the operational abnormality of the second torque monitor device 19 or of the signal abnormality diagnosis device 20 exists based on the abnormality diagnosis result obtained at step 101. When it is determined that the operational abnormality of the second torque monitor device 19 exists or the operational abnormality of the signal abnormality diagnosis device 20 exists at step 102, the operation proceeds to step 107. At step 107, the fail-safe signal is outputted, so that the fail-safe control operation is executed immediately. In the fail-safe control operation, for example, the throttle position may be forcefully maintained at the predetermined position (known as the opener position) to limit the intake air quantity of the engine and thereby to limit an output torque of the engine.

In contrast, when it is determined that the operational abnormality of the second torque monitor device 19 does not exist, and the operational abnormality of the signal abnormality diagnosis device 20 does not exist at step 102, the operation proceeds to step 103. At step 103, the signal processing device 16 computes the control signals (e.g., the signal indicating the sensed accelerator position value, the signal indicating the sensed throttle position value) based on the sensor output signals, which have been previously A/D converted (e.g., the output signal of the accelerator position sensor 11, which has been previously A/D converted, and the output signal of the throttle position sensor 12, which has been previously A/D converted).

Thereafter, the operation proceeds to step 104 where the second torque monitor device 19 computes the actual torque based on the sensed throttle position value and also computes the requested torque based on the sensed accelerator position value. Then, the operation proceeds to step 105 where the second torque monitor device 19 determines whether a difference between the actual torque and the requested torque is larger than the preset value to determine whether there exists the torque increase abnormality, in which the actual torque becomes excessively large relative to the requested torque.

When it is determined that the difference between the actual torque and the requested torque is larger than the preset value at step 105, it is determined that the torque increase abnormality exists. Then, the operation proceeds to step 107 where the fail-safe signal is outputted, so that the fail-safe control operation is executed immediately.

In contrast, when it is determined that the difference between the actual torque and the requested torque is equal to or less than the preset value at step 105, it is determined that the torque increase abnormality does not exist. Thereby, the operation proceeds to step 106 where the signal abnormality diagnosis device 20 determines whether the output signal APS_AD of the accelerator position sensor 11, which has been previously A/D converted, is smaller than the predetermined value A1, while the sensed accelerator position value APS is larger than the predetermined value A2 (i.e., whether the output signal APS_AD of the accelerator position sensor 11 is in the low level while the sensed accelerator position value APS is in the high level) to determine whether the relationship between the output signal APS_AD of the accelerator position sensor 11 and the sensed accelerator position value APS is the relationship, which interferes with the sensing of the torque increase abnormality at the second torque monitor device 19, and thereby to determine whether the operational abnormality of the signal processing device 16 exists.

When it is determined that the output signal APS_AD of the accelerator position sensor 11 is in the low level while the sensed accelerator position value APS is in the high level at step 106, it is determined that the operational abnormality of the signal processing device 16 exists. Thereby, the operation proceeds to step 107 where the fail-safe signal is outputted, so that the fail-safe control operation is executed immediately.

In contrast, when it is determined that the output signal APS_AD of the accelerator position sensor 11 is in the high level or the sensed accelerator position value APS is in the low level at step 106, it is determined that the operational abnormality of the signal processing device 16 does not exist. Thereby, the current routine is terminated without executing the fail-safe control operation.

Figure 5:
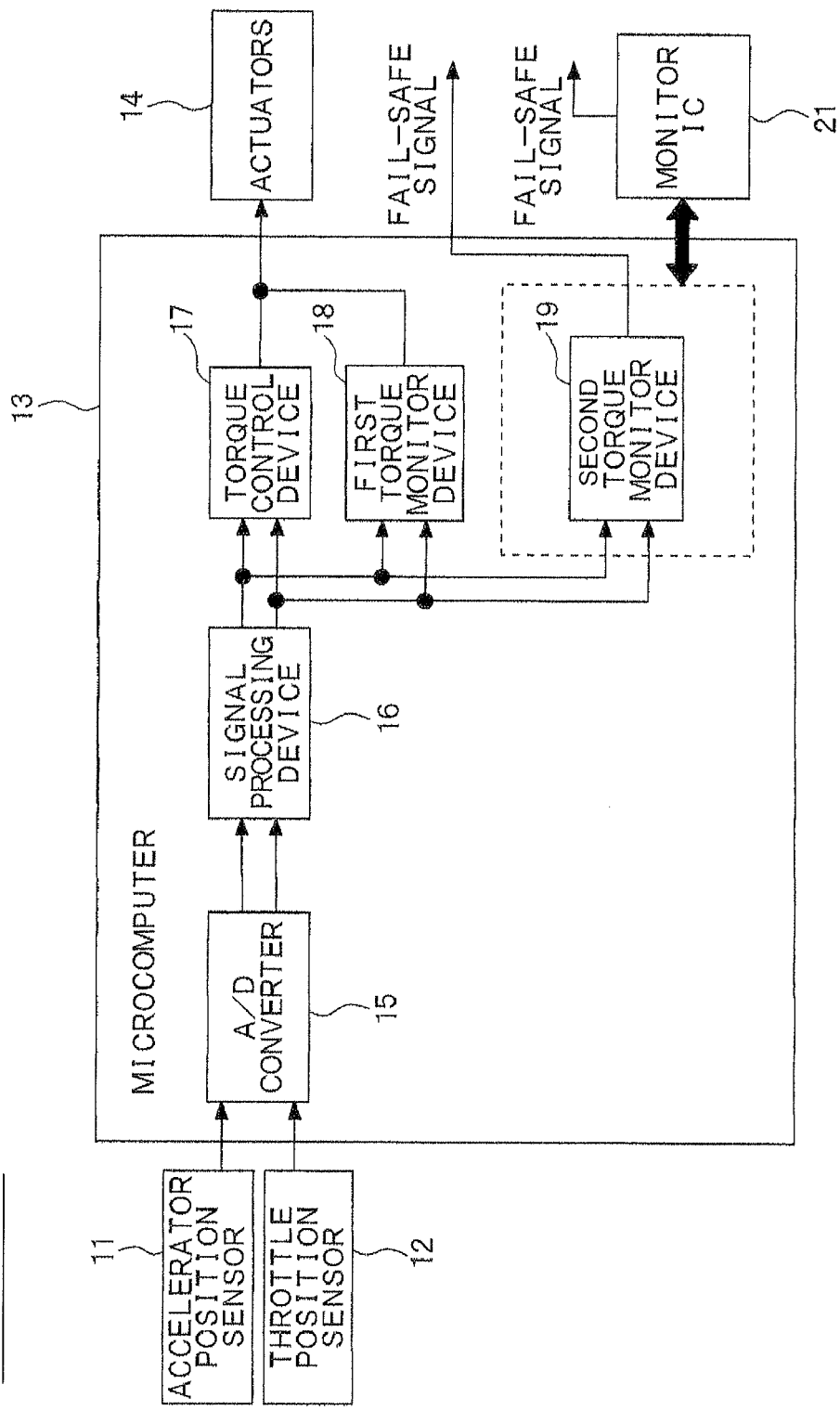
FIG. 5 is a block diagram showing a first comparative example of the torque control system.

FIG. 5 shows the first comparative example of the torque control system, which is provided for the purpose of illustrating advantages of the embodiment of the present invention. In the first comparative example shown in FIG. 5, the signal abnormality diagnosis device 20 of the torque control system of the embodiment shown in FIG. 1 is eliminated, and the monitor IC 21 monitors the operational state of the second torque monitor device 19 to determine whether the operational abnormality of the second torque monitor device 19 exists.

In the torque control system of the first comparative example shown in FIG. 5, although it is possible to guarantee the proper operation of the second torque monitor device 19 with use of the monitor IC 21, there is no function, which guarantees the proper operation of the signal processing device 16. Therefore, in a case where the second torque monitor device 19 functions properly, when the abnormal value of the control signal (e.g., the sensed accelerator position value) is generated due to the operational abnormality of the signal processing device 16, the second torque monitor device 19 determines whether the torque increase abnormality exists based on the abnormal control signal. Therefore, in a case where the torque increase abnormality actually exists, there is a high possibility of that such a torque increase abnormality cannot be sensed, and thereby the operational reliability of the control system cannot be sufficiently ensured.

Figure 6:
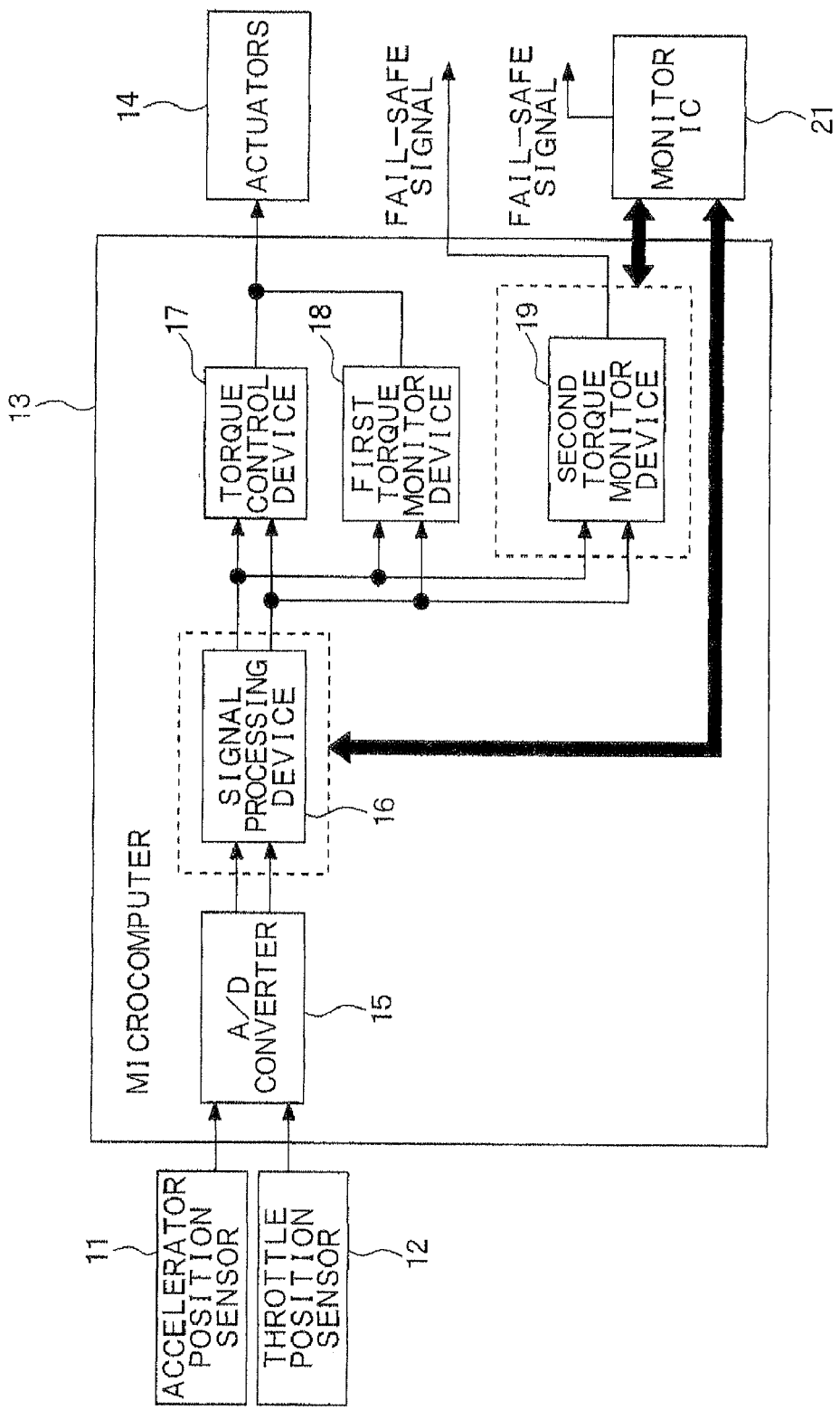
FIG. 6 is a block diagram showing a second comparative example of the torque control system.

In order to address the above disadvantage, in the torque control system of the second comparative example shown in FIG. 6, the monitor IC 21 monitors the operational state of the signal processing device 16 and the operational state of the second torque monitor device 19 and determines whether the operational abnormality of the signal processing device 16 or of the second torque monitor device 19 exists. In this way, the proper operation of the signal processing device 16 and the proper operation of the second torque monitor device 19 are guaranteed with the monitor IC 21.

However, in the torque control system of the second comparative example, the monitor IC 21 monitors the operational state of the signal processing device 16. Therefore, the signal processing device 16 needs to have the additional function of executing the computation based on the test data, and the monitor IC 21 needs to have the additional function of checking the computed result of the signal processing device 16, which is computed based on the test data. Therefore, the computational load is increased on the microcomputer 13 and the monitor IC 21. As a result, it is necessary to increase the computational performance of the microcomputer 13 and the computational performance of the monitor IC 21. Thus, in such a case, it is not possible to satisfy the low cost demand.

In comparison to this, in the torque control system of the embodiment shown in FIG. 1, the monitor IC 21 guarantees the proper operation of the second torque monitor device 19 and the proper operation of the signal abnormality diagnosis device 20, so that the proper operation of the signal processing device 16 is indirectly guaranteed. As discussed above, the proper operation of the second torque monitor device 19 and the proper operation of the signal processing device 16 are both guaranteed. Then, the second torque monitor device 19 is used to determine whether the torque increase abnormality exists. Therefore, it is possible to avoid the error (incapability) of the second torque monitor device 19 for sensing the occurrence of the torque increase abnormality caused by the operational abnormality at the signal processing device 16. Thereby, the proper operation of the torque control system can be guaranteed with the single microcomputer 13 and the single monitor IC 21.

Furthermore, the signal abnormality diagnosis device 20 makes the simple abnormality determination by determining whether the operational abnormality of the signal processing device 16 exists through determination of whether the relationship between the output signal APS_AD of the accelerator position sensor 11 and the sensed accelerator position value APS is the relationship, which interferes with the sensing of the torque increase abnormality by the second torque monitor device 19. Therefore, the monitor IC 21 can guarantee the proper operation of the signal processing device 16 by monitoring the simple abnormality determination of the signal abnormality diagnosis device 20. In this way, the computational load of the microcomputer 13 and the computational load of the monitor IC 21 can be reduced. Thus, it is not required to increase the computational performance of the microcomputer 13 and the computational performance of the monitor IC 21. As a result, it is possible to meet the low cost demand, which is considered as the important technical goal in these days.

In the above embodiment, the signal abnormality diagnosis device 20 determines whether the operational abnormality of the signal processing device 16 exists based on the relationship between the output signal of the accelerator position sensor 11, which has been previously A/D converted, and the sensed accelerator position value, which is computed at the signal processing device 16. However, the present invention is not limited to this. For example, in a case where the signal processing device 16 computes an estimated actual torque value, it is possible to determine whether the operational abnormality of the signal processing device 16 exists based on a relationship between the output signal of the throttle position sensor 12, which has been previously A/D converted, and the estimated actual torque value, which is computed at the signal processing device 16.

More specifically, as shown in FIG. 2B, it is determined whether the output signal Thr_AD of the throttle position sensor 12, which has been previously A/D converted, is in the low level or in the high level through the determination of whether the output signal Thr_AD of the throttle position sensor 12 is smaller than a predetermined value T1 (e.g., the sensor output that is slightly larger than the sensor output obtained at a fully closed throttle position, in which the throttle valve is placed in a full close position thereof in an air intake passage). Also, it is determined whether the estimated actual torque value Trq, which is computed at the signal processing device 16, is in the low level or in the high level through the determination of whether the estimated actual torque value Trq is smaller than a predetermined value T2 (e.g., the torque that is slightly larger than the torque obtained at the fully closed throttle position).

When the output signal Thr_AD of the throttle position sensor 12 and the estimated actual torque value Trq are both in the low level or both in the high level, the relationship between the output signal Thr_AD of the throttle position sensor 12 and the estimated actual torque value Trq is correct. Therefore, it is determined that the operational abnormality of the signal processing device 16 does not exist, i.e., it is determined that the operation of the signal processing device 16 is normal.

Furthermore, in the case where the output signal Thr_AD of the throttle position sensor 12 is in the low level while the estimated actual torque value Trq is in the high level, the relationship between the output signal Thr_AD of the throttle position sensor 12 and the estimated actual torque value Trq is not correct. However, in such a case, the estimated actual torque value Trq becomes abnormally large, so that the second torque monitor device 19 determines that the torque increase abnormality (the abnormality, in which the actual torque becomes excessively large relative to the requested torque) exists. Therefore, it is determined that the relationship between the output signal Thr_AD of the throttle position sensor 12 and the estimated actual torque Trq is the relationship, which can be sensed as the torque increase abnormality by the second torque monitor device 19. Thereby, the signal abnormality diagnosis device 20 determines that the operational abnormality of the signal processing device 16 does not exist.

Furthermore, in a case where the output signal Thr_AD of the throttle position sensor 12 is in the high level (the output signal Thr_AD of the throttle position sensor 12 being larger than the predetermined value T1, i.e., being on the valve opening side of the predetermined value T1) while the estimated actual torque value Trq is in the low level (the estimated actual torque value Trq being smaller than the predetermined value T2), the relationship between the output signal Thr_AD of the throttle position sensor 12 and the estimated actual torque value Trq is not correct. In this case, the estimated actual torque value Trq becomes abnormally small, so that it is difficult for the second torque monitor device 19 to sense the torque increase abnormality (the abnormality, in which the actual torque becomes excessively large relative to the requested torque). Therefore, it is determined that the relationship between the output signal Thr_AD of the throttle position sensor 12 and the estimated actual torque value Trq is the relationship, which interferes with the sensing of the torque increase abnormality by the second torque monitor device 19. Thereby, the signal abnormality diagnosis device 20 determines that the operational abnormality of the signal processing device 16 exists.

Furthermore, in the above embodiment, even in the case where the relationship between the sensor output signal (e.g., the output signal of the accelerator position sensor 11) and the control signal (e.g., the sensed accelerator position value) is not correct, as long as the relationship between the sensor output signal and the control signal is the relationship, which can be sensed as the torque increase abnormality by the second torque monitor device 19, it is determined that the operational abnormality of the signal processing device 16 does not exist. Alternatively, this relationship may be determined as the relationship, which indicates that the operational abnormality of the signal processing device 16 exists.

The present invention is not limited to the control device, which processes the output signals of the accelerator position sensor 11 and of the throttle position sensor 12. That is, the present invention may be implemented in other control devices, which process the output signals of the various sensors (e.g., an airflow sensor, an intake pressure sensor, a crank angle sensor, a cam angle sensor, an in-cylinder pressure sensor, a coolant temperature sensor, a knock sensor, an external air temperature sensor, an atmospheric pressure sensor) installed in the vehicle.

Furthermore, the present invention is not limited to the torque control system of the engine. For example, the present invention may be applied to other control systems (e.g., an air/fuel ratio control system, an idling rotation control system) of the engine or may be applied to other control systems of the vehicle (e.g., a traction control system, an electric motor control system of an electric vehicle).

Additional advantages and modifications will readily occur to those skilled in the art. The invention in its broader terms is therefore not limited to the specific details, representative apparatus, and illustrative examples shown and described.

What is claimed is:
1. A control apparatus for a vehicle, comprising:
a microcomputer that includes:
    a signal processing device that computes a control signal, which is used in a control operation of the vehicle, based on an analogue-to-digital converted output signal, which is outputted from at least one sensor installed in the vehicle and is converted from analogue to digital;
    a control abnormality diagnosis device that determines whether a control abnormality of the microcomputer exists based on the control signal; and
    a signal abnormality diagnosis device that determines whether an operational abnormality of the signal processing device exists based on a relationship between the analogue-to-digital converted output signal of the at least one sensor and the control signal; and
a monitor device that determines whether at least one of an operational abnormality of the control abnormality diagnosis device or an operational abnormality of the signal abnormality diagnosis device exists by monitoring an operational state of the control abnormality diagnosis device and an operational state of the signal abnormality diagnosis device, wherein the monitor device is provided separately from the microcomputer.

2. The control apparatus according to claim 1, wherein the signal abnormality diagnosis device determines the operational abnormality of the signal processing device exists when the relationship between the analogue-to-digital converted output signal of the at least one sensor and the control signal becomes a relationship, which interferes with sensing of the operational abnormality by the control abnormality diagnosis device.

3. The control apparatus according to claim 1, further comprising an execution device that executes a predetermined fail-safe control operation when at least one of the control abnormality diagnosis device, the signal abnormality diagnosis device or the monitor device determines that the abnormality exists.

4. The control apparatus according to claim 1, wherein:
the microcomputer further includes a torque control device that controls an actual torque of an internal combustion engine of the vehicle to coincide with a requested torque based on the control signal; and
the control abnormality diagnosis device determines whether a torque increase abnormality of the internal combustion engine exists by comparing the actual torque of the internal combustion engine and the requested torque based on the control signal.

5. The control apparatus according to claim 4, wherein:
the at least one sensor includes an accelerator position sensor;
the signal processing device computes a sensed accelerator position value as the control signal based on an analogue-to-digital converted output signal of the accelerator position sensor, which is outputted from the accelerator position sensor and is converted from analogue to digital; and
the signal abnormality diagnosis device determines that the operational abnormality of the the signal processing device exists in a case where the sensed accelerator position value is larger than a predetermined value although the analogue-to-digital converted output signal of the accelerator position sensor is smaller than a predetermined value.

6. The control apparatus according to claim 4, wherein:
the at least one sensor includes a throttle position sensor;
the signal processing device computes an estimated actual torque value as the control signal based on an analogue-to-digital converted output signal of the throttle position sensor, which is outputted from the throttle position sensor and is converted from analogue to digital; and
the signal abnormality diagnosis device determines that the operational abnormality of the signal processing device exists in a case where the estimated actual torque value is smaller than a predetermined value although the analogue-to-digital converted output signal of the throttle position sensor is larger than a predetermined value.

7. The control apparatus according to claim 1, wherein:
the signal abnormality diagnosis device determines whether a level of the analogue-to-digital converted output signal is a high level or a low level relative to a threshold;
the signal abnormality diagnosis device determines whether a level of the control signal is a high level or a low level relative to a threshold; and
the signal abnormality diagnosis device determines whether the operational abnormality of the signal processing device exists through comparison of the determined level of the analogue-to-digital converted output signal and the determined level of the control signal.

* * * * *